July 26, 1938.  G. D. GAMEL  2,125,157
AUTOMATIC RECLOSING DEVICE FOR CIRCUIT BREAKERS
Filed Feb. 20, 1937

WITNESSES:
E. A. McCloskey
Joe Weber

INVENTOR
Gayne D. Gamel.
BY J. M. Crawford
ATTORNEY

Patented July 26, 1938

2,125,157

UNITED STATES PATENT OFFICE 2,125,157

AUTOMATIC RECLOSING DEVICE FOR CIRCUIT BREAKERS

Gayne D. Gamel, Wilkinsburg, Pa., assignor to Westinghouse Electric & Manufacturing Company, East Pittsburgh, Pa., a corporation of Pennsylvania Application February 20, 1937, Serial No. 126,864

5 Claims. (Cl. 175—294)

My invention relates generally to electrical control systems and particularly to systems for automatically reclosing circuit breakers.

In the operation of electrical power systems and particularly transmission and distribution systems, trouble often occurs on the lines and causes the circuit breakers which connect the line to the source of power to open. Since the trouble may be clear from the line very soon after opening of the breaker or may be cleared from the line by again energizing the line, it is desirable to reclose the circuit breaker in an effort to again energize the line.

In order that too great a burden may not be placed on the circuit breakers by causing them to break the heavy current due to the fault too soon after a previous operation and in order to allow time in which the fault may clear itself, it is desirable that the circuit breaker be held open for a time after each opening and that the number of openings in a given length of time be so limited as to prevent damage to the breaker.

The object of the invention is to provide a system for automatically reclosing a circuit breaker after it has been automatically opened because of a fault or other abnormal condition on the line to which it is connected.

Another object of my invention is to provide a control device for an automatic reclosing circuit breaker system which will function to cause a circuit breaker to reclose at the end of a predetermined length of time after it opens.

A further object of my invention is to provide a control device for an automatic reclosing circuit breaker system which will function to cause a circuit breaker to reclose at a predetermined length of time after it is opened and will repeat the reclosure of the breaker at such intervals a predetermined number of times in the event that the breaker reopens immediately after each reclosure.

Another object of my invention is to provide a device for controlling an automatic reclosing circuit breaker system which will function to cause a circuit breaker to reclose a predetermined number of times in the event that the breaker reopens immediately after each reclosure and to render the reclosing system inoperative after such predetermined number of reclosures until it is reset manually.

Another object of the invention is to provide a device for controlling an automatic reclosing circuit breaker system which shall be of simple construction, inexpensive to manufacture and install, easy and inexpensive to maintain and reliable in operation.

Another object of the invention is to provide a system for automatically reclosing a circuit breaker a predetermined number of times and then locking the closing means in inoperative condition after a predetermined number of reclosures in the event that the breaker continues to reopen immediately upon being reclosed, said lockout means being a mechanical device which operates independent of the power source or a control source.

These and other objects and advantages of the invention which will be apparent to those skilled in the art are accomplished by causing a relay to be energized when the circuit breaker is in the open position, controlling the closing of the circuit breaker by the relay contacts, delaying the closing of the relay contacts by a timing mechanism, and causing the relay contacts to be locked in the open position after a predetermined number of reclosures of the circuit breaker in a series of operations in which the breaker has opened immediately after each reclosure. In the event that the breaker stays closed before the predetermined number of reclosures has been effected, the timing mechanism resets itself for another series of timed reclosures.

For a more complete understanding of the invention, reference should be had to the following specification and the accompanying drawing, in which.

Figure 1:
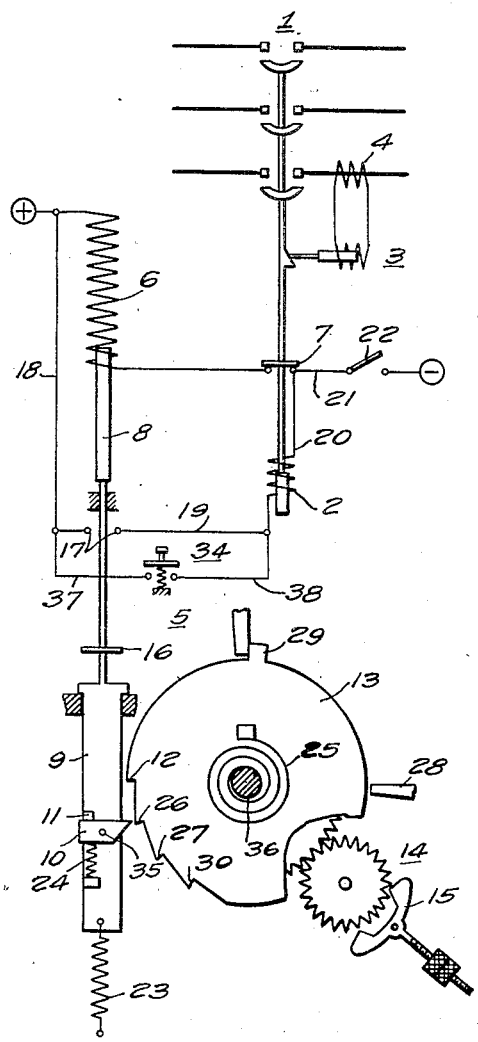
Figure 1 is a diagrammatic representation of one form of the invention.

Referring to Fig. 1, there is shown a circuit breaker 1 for connecting together two sections of power lines. The circuit breaker 1 is provided with a closing coil 2 and an electromagnetic trip device 3 which functions to hold the breaker closed. The electromagnetic trip device 3 may be energized from the overload coil 4, which is associated with the power line. The trip device 3 may be made responsive to abnormal conditions on the power line other than overload. The reference character 5 indicates generally the mechanism for controlling the reclosure of the circuit breaker after it has tripped open and comprises a coil 6, which is energized from the source of control current indicated by the plus and minus signs, through a contact element 7, which closes the control circuit for coil 6 when the circuit breaker is in the open position.

Upon energization of solenoid coil 6, its core 8 is attracted and carries with it in its movement an element 9, upon which is mounted a pawl 10 which is biased against a stop member 11 by spring member 24.

As pawl 10 is moved upward, it engages shoulder 12 and causes rotation of the ratchet element 13 until ratchet element 13 has rotated upon its axis 36 to such a position as to allow the pawl 10 to slip by the shoulder 12.

The movement of the ratchet wheel 13 is retarded by a timing device generally represented at 14 which comprises a train of gears, the movement of which is retarded by the escapement device 15. This retardation of the movement of ratchet wheel 13 causes a delay in the movement of the solenoid core 8 into solenoid coil 6. After the pawl 10 has rotated ratchet wheel 13 to such a position as to allow the said pawl to slip by shoulder 12, the solenoid core 8 will move freely into solenoid coil 6 and will cause movable contact element 16 to bridge contact elements 17, thus completing a circuit through the closing coil 2 of the circuit breaker. This circuit includes the positive side of the control source, conductor 18, contact elements 16 and 17, conductor 19, closing coil 2, conductor 20, conductor 21 and hand switch 22 to the negative side of the source of control power.

This energization of closing coil 2 causes the circuit breaker to close, and the movement of the circuit breaker to closed position causes the contact element 7 to break the circuit of the solenoid coil 6, thus causing the spring element 23 to return the solenoid core 8 and the pawl 10 to their normal retracted position. In the return movement, pawl 10 is permitted to return past the teeth on the ratchet wheel 13, since it is free to move about its pivot 35 against the biasing spring 24.

Ratchet wheel 13 is biased by spring 25 to the position shown in the drawing, and after the pawl 10 has returned to its normal position, spring 25 tends to return ratchet wheel 13 to its normal position. The movement of ratchet wheel 13 from the position to which it has been moved by the upward movement of pawl 10 is retarded by the timing mechanism 14.

As a result of this operation of the device, in the event that the circuit breaker trips out immediately after the first reclosure, pawl 10 will again be drawn upward by solenoid coil 6 by virtue of the opening of this switch as hereinbefore described, and will this time engage shoulder 26 to again move ratchet wheel 13 in a clockwise direction against the tension of its biasing spring 25 and against the retarding action of the timing device 14.

In the event that the circuit breaker trips again after the second reclosure, the ratchet wheel 13 will be in such a position as to cause its shoulder 27 to be engaged by the pawl 10 in its upward movement, and a third retarded reclosure of the circuit breaker will result. This action will be repeated in the event that the circuit breaker continues to reopen immediately upon reclosure until the stop element 28 is engaged by shoulder 29 on ratchet wheel 13 to prevent further movement of ratchet wheel 13, and, therefore, further movement of pawl 10 and solenoid core 8. This results in preventing further closure of the circuit breaker, and the mechanism will remain in this position with the pawl 10 bearing against the last shoulder 30 on the ratchet wheel 13 and held in this position by the solenoid coil 6, which is held energized by the contact element 7, on the circuit breaker 1, which is in the closed circuit position.

Any desired number of reclosures of the circuit breaker may be obtained by so positioning stop member 28 as to be engaged by further movement of shoulder 29 after the desired number of reclosures has been accomplished. The ratchet wheel 13 may be provided with as many ratchet shoulders as is necessary to effect a desired number of reclosures.

It is understood that the timing mechanism 14 may be adjusted to give any desired time delay and may be any form of time delay device. If it is so desired, some timing mechanism which will give a different time delay of the movement of the ratchet element 13 from and to the normal position may be provided.

The time delay in the movement of the ratchet element 13 back to its normal position is provided so that lockout of the switch will not occur if an appreciable length of time elapses between the closure of the circuit breaker and its next opening.

The initial closure of the circuit breaker is brought about by momentarily closing push button switch 34 after the control circuit switch 22 has been closed. This energizes the circuit breaker closing coil 2 through a circuit which includes the positive side of the control source conductor 18, conductor 37, switch 34, conductor 38, coil 2, conductors 20 and 21, and switch 22 to the negative side of the power source.

Figure 2:
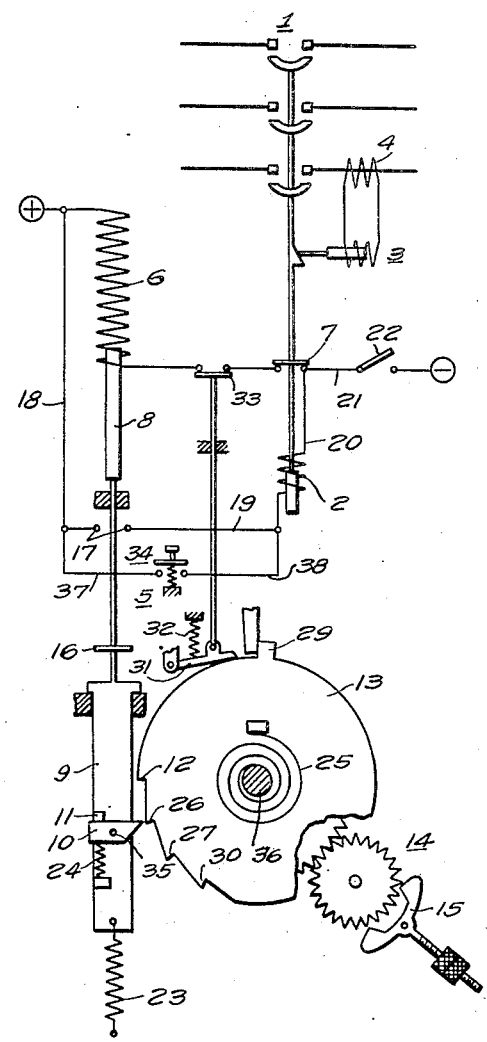
Fig. 2 is a modification of the device shown in Fig. 1.

The modification of Fig. 2 embodies substantially the same mechanism and cooperation of parts as that of Fig. 1, and in addition a lockout device is provided which will operate without the necessity of sustained energization of the solenoid coil 6. Like elements in these two figures are numbered alike. In the device of Fig. 2, there is provided a latch member 31, which is biased to bear on the ratchet wheel 13 by a spring 32. Contact element 33 is controlled by the latch member 31 and is held in closed position while latch member 31 bears on the periphery of the ratchet wheel 13.

When such a number of switch closures has occurred as to cause shoulder 12 to be stepped around to such a position as to allow latch member 31 to be pressed in behind shoulder 12 by spring 32, this movement of latch member 31 will cause contact element 33 to break the circuit of solenoid coil 6, thus preventing further energization of solenoid coil 6. Since solenoid coil 6 cannot be further energized, there can be no further movement of contact element 16 to close the circuit of the closing coil 2 and this will cause the circuit breaker to be locked out. The return of ratchet wheel 13 to its normal position by its spring 25 will be prevented by latch member 31, since it acts as a stop member as it lies behind shoulder 12.

The desired number of reclosures of the circuit breaker may be obtained by this mechanism by so positioning latch member 31 as to cause it to be pressed behind shoulder 12 after the desired number of circuit breaker reclosures have occurred.

It will be seen that I have provided a control device for an automatic reclosing circuit breaker system which will function to cause the circuit breaker to close a predetermined number of times in the event that it automatically opens immediately upon each reclosure, and which will extend the number of reclosures in the event that a predetermined time elapses between any closure of the circuit breaker and its next opening.

Since the control device is controlled electrically in accordance with the opening and closing operations of the circuit breaker and requires no mechanical operating connection with the breaker it may take the form of a separate attachment which may be applied to any breaker at any time.

In compliance with the requirements of the patent statutes, I have shown and described herein a preferred embodiment of my invention. It is understood, however, that the invention is not limited to the precise constructions shown and described, but is capable of modification by one skilled in the art, the embodiments herein shown being merely illustrative of the principles of my invention.

I claim as my invention:

1. In a control device for a circuit interrupter having tripping means and closing means, the combination of a controlling member for the closing means movable between an advanced position and a retracted position and biased toward the retracted position, actuating means for moving the controlling member to the advanced position, time delay means for retarding the movement of the controlling member from the retracted to the advanced position, said time delay means comprising a ratchet member movable between an advanced position and a retracted position, means for retarding the movement of the ratchet member in both directions, the ratchet member being biased to retracted position, a pawl on the controlling member so positioned as to engage the ratchet member in the movement of the controlling member to advanced position to thereby retard the advancing movement of the controlling member in moving the ratchet member toward advanced position to allow free movement of the controlling member to retracted position, and to permit the ratchet member to be moved by its bias to its retracted position when the controlling member is in retracted position, means for limiting the advance of the ratchet member to a predetermined amount to limit the number of advancing movements of the control member within a predetermined time, means governed by the circuit breaker position for controlling the actuating means for the controlling member.

2. In a control device for a circuit breaker having tripping means and closing means, the combination of means for actuating the circuit breaker closing means, said actuating means comprising a controlling member movable between an advanced position and a retracted position and biased toward the retracted position, actuating means for moving the controlling member to the advanced position, time delay means for retarding the movement of the controlling member from the retracted to the advanced position, said time delay means comprising a ratchet member movable between an advanced position and a retracted position, means for retarding the movement of the ratchet member in both directions, the ratchet member being biased to retracted position, a pawl on the controlling member so positioned as to engage the ratchet member in the movement of the controlling member to advanced position to thereby retard the advancing movement of the controlling member in moving the ratchet member toward advanced position, to allow free movement of the controlling member to retracted position, and to permit the ratchet member to be moved by its bias to its retracted position when the controlling member is in retracted position, means for limiting the advance of the ratchet member to a predetermined amount to limit the number of reclosures of the circuit breaker by the controlling member within a predetermined time, and means for driving said actuating means when the circuit breaker is in the open position.

3. In an automatic reclosing system for a circuit breaker having a closing coil, the combination of a circuit control means for the closing coil, a time delay means for operating said control means a predetermined time after the circuit breaker opens, said time delay means comprising an actuating member for the control means movable between an advanced position and a retracted position and biased toward the retracted position, means for moving the actuating member to the advanced position, said means comprising an electromagnetic device and a control circuit therefor which is closed when the circuit breaker is open, a ratchet member movable between an advanced position and a retracted position, means for retarding the movement of the ratchet member in both directions, the ratchet member being biased to retracted position, a pawl on the actuating member so positioned as to engage the ratchet member in the movement of the actuating member to advanced position to thereby retard the advancing movement of the actuating member in moving the ratchet member toward advanced position, to allow free movement of the actuating member to retracted position, and to permit the ratchet member to be moved by its bias to its retracted position when the actuating member is in retracted position, and means for limiting the advance of the ratchet member to a predetermined amount to limit the number of reclosures of the circuit breaker within a predetermined interval of time comprising a latch means for preventing movement of the ratchet member toward the retracted position and means controlled by said latch means for opening the circuit of the electromagnetic device.

4. The combination with a circuit controlling device provided with automatic tripping means and electro-responsive means for closing the circuit controlling device, of two relatively movable members, ratchet means on one of said members, pawl means on the other of said members cooperating with said ratchet means to move said one member when said other member is moved in one direction, said other member being freely movable in the opposite direction to that in which it moves the one member and being biased in said opposite direction, means for retarding the movement of said one member, means biasing said one member in a direction opposite to the direction in which it is moved by said pawl, means responsive to the open circuit condition of the circuit breaker for moving said other member to move said one member, means whereby predetermined movement of said other member causes energization of the electro-responsive closing means for the circuit controlling device, and means limiting the movement of the one member by the pawl means.

5. In a circuit control device for the closing coil of a circuit breaker, in combination, a ratchet member movable in retracted and advanced directions, stop means for limiting the movement of said ratchet member in the retracted and advanced directions, means biasing said ratchet member in the retracted direction, means for retarding the movement of the ratchet member in either direction, a contact element in circuit controlling relation with the closing coil, a movable member for moving said contact element to and from closed circuit position, a pawl so mounted on said movable member as to engage said ratchet as said member moves said contact element to closed circuit position and to pass by said ratchet on its return movement, means biasing said movable member to effect the return movement of the member and to thereby move said contact element to open circuit position, electromagnetic means for actuating said movable member to move said contact element to closed circuit position.

GAYNE D. GAMEL.